3,120,997
PROCESS FOR PRODUCING ALKALI METAL SUPEROXIDES

Americo W. Petrocelli, Westerly, R.I., assignor to General Dynamics Corporation, New York, N.Y., a corporation of Delaware
No Drawing. Filed Aug. 25, 1961, Ser. No. 133,797
5 Claims. (Cl. 23—184)

This invention relates generally to superoxides of alkali metals and more specifically to a process for producing such superoxides.

The alkali metal superoxides have found significant value as a relatively plentiful source of oxygen for breathing apparatus and for restricted atmosphere areas such as submarines. These compounds can be utilized as a solid state storage media for oxygen and as scavengers of carbon dioxide. Presently these higher oxides are being considered for use as oxygen suppliers and carbon dioxide scavengers in manned space vehicles.

Superoxides of an alkali metal have in the past been produced by the combustion of the pure alkali metal in oxygen. Such processes involve the use of the pure alkali metal, and thereby suffer from the attendant problem factors of cost, handling and storage of such material. United States Patent No. 2,648,596 issued to Schechter is in point. An example of an attempt to circumvent the problems of the prior art is found in the chemical procedural approach presented by United States Patent No. 2,908,552 issued to Cunningham.

It is the primary object of this invention to provide an improved and simplified process for producing alkali metal superoxides.

A specific object of this invention is to provide an improved, economical process for producing alkali metal superoxides.

Another object of this invention is to provide an improved process for producing potassium-superoxide.

A further object of this invention is to provide a process for producing alkali metal superoxides from readily available materials under reasonable production conditions.

Another object of this invention is to provide a process for obtaining an alkali metal superoxide from the reaction mixture obtained by directly mixing the solid hydroxide of the metal with hydrogen peroxide.

With the foregoing and other objects in view, the invention resides in the following specification and appended claims.

While the following description of the process will be specific to the production of $KO_2$, potassium superoxide, it is readily applicable to the production of sodium and other alkali metal superoxides.

The reagents involved in the process are KOH (solid) or other alkali metal hydroxide and $H_2O_2$.

The potassium hydroxide and hydrogen peroxide are preferably mixed in the approximate molar ratio of 1:2. Following the final addition of the $H_2O_2$, the reaction mixture is stirred until the resulting vigorous evolution of $O_2$ gas and $H_2O$ vapor ceases. The liquid reaction mixture is then subjected to vacuum desiccation over concentrated sulfuric acid or another suitable desiccant. Following the desiccating step, substantially pure solid potassium superoxide $KO_2$ in a stable form remains.

The above described processes may be modified with a similar result being achieved. For example, the molar ratio of 1:2 of KOH or NaOH to $H_2O_2$ has been found to be preferred in providing efficient production of the superoxides, but is by no means exclusive of other molar ratios. Substantial departure from the 1:2 ratio does not render the process unworkable, merely inefficient or wasteful in nature. Also, the temperature conditions and the type of desiccating equipment and material may be varied.

In a specific example whereby the process was successfully practiced, 16.7 milliliters of a 50% solution of $H_2O_2$ was slowly added over a five minute time period to 8.15 grams of solid KOH in a reaction flask submerged in an ice water bath. The addition reaction was very exothermic and was accompanied by a copious evolution of gases. The vigorous reaction subsided within a minute following the last addition of $H_2O_2$. At this time the solution was transferred to a vacuum desiccator charged with concentrated sulfuric acid and the solution was pumped to dryness, at which time a bright yellow compound was recovered. Analysis of the yellow compound showed it to be 94.6% $KO_2$. The yield of $KO_2$ based on KOH consumption was calculated to be a very efficient 86%.

Another specific example of a test procedure involved the addition of 16.5 milliliters of a 50% solution of $H_2O_2$ over a ten minute period of time to 8.2 grams of solid KOH in a reaction flask submerged in a Dry Ice-acetone bath at about $-76°$ C. No initial vigorous reaction occurred as in the example above. However, as the reaction mixture was slowly heated in air, the mixture evolved gas as the KOH reacted with the $H_2O_2$. In twenty minutes the reaction flask had attained room temperature, and gaseous evolution had ceased. The reaction mixture was pumped to dryness as described above and again the bright yellow solid $KO_2$ was recovered. Thus, even with a substantial reduction in the temperature of the bath, as compared with the specific example above, and a consequential lengthening of the procedure time, $KO_2$ was successfully recovered.

In a typical test to determine efficient ratios of materials, a purposefully high excess of $H_2O_2$, 50% solution, was added to solid KOH in a reaction flask at room temperature. More specifically, a total of 47 milliliters of the $H_2O_2$ solution was added to 8.2 grams of KOH over a thirty minute time period. Following the final addition of $H_2O_2$ solution, the reaction mixture was pumped to dryness as described above, and 9.3 grams of $KO_2$ was recovered. Thus, while the procedure was successful in producing $KO_2$, it was considerably less efficient in the use of materials than was the first specific example above. This and other experiments practicing the procedure lead to the conclusion, stated above, that the molar ratio of about 1:2 of KOH or NaOH to $H_2O_2$ is to be preferred from an efficiency standpoint in practicing the invention. Also, while considering the efficiency of the molar ratio of KOH to $H_2O_2$ in producing the $KO_2$, it becomes apparent that any ratio would be operative to produce some quantity of $KO_2$, even if the ratio were so disproportionate as to produce a practically non-recoverable amount of $KO_2$. As illustrated by the various specific examples, the invention may be practiced successfully under different temperature conditions. Preferably, however, the procedure is carried out with the flask submerged in an ice water bath to decrease the possibilities of explosion by somewhat slowing down the vigorous reaction between the $H_2O_2$ and the KOH, without substantially lengthening the period for the entire reaction to be completed.

The process and reactions involved may be readily verified. One need only react the superoxide, $KO_2$ with about 30% $H_2O_2$. In this manner about 70% of the water is eliminated leaving KOH and $H_2O_2$ to react to form $K_2O_2 \cdot 2H_2O_2$. As soon as the reaction between the $KO_2$ and the excess $H_2O$ in the $H_2O_2$ is complete, the reaction mixture is placed in a vacuum desiccator over concentrated $H_2SO_4$ and is pumped to dryness. In this manner $H_2O$ is removed as quickly as it is formed and $KO_2$ is isolated.

In practicing this invention various concentrations of $H_2O_2$ were tested. As a general rule it was found to be better to use a more concentrated solution of $H_2O_2$. However, there is no practical reason for using a concentration greater than 50%. On the other hand the use of concentrations less than 40% proved to be ineffectual. Thus it is obvious that concentrations of $H_2O_2$ greater than 40% are desirable.

The solid KOH utilized in the method is a commercial grade and is preferably dry. Moist KOH may be used, but the presence of any moisture in the KOH would result in a further dilution of the $H_2O_2$.

An important consideration in the successful practice of the invention is the elapsed time between the termination of the reaction between the KOH and the $H_2O_2$ and the submission of the mixture to the desiccation step. Experimental result has indicated that, if substantially more than one minute elapses before desiccation, the efficiency of the yield will be reduced and obviously, if too great a time elapses, all the $KO_2$ will react with water, and there will be no yield. On the other hand, in order to avoid the danger of explosion, it is desirable that the vigorous reaction of the materials has subsided before commencing with desiccation.

Thus it should be apparent to one skilled in the art that the invention provides a simplified and relatively inexpensive method of obtaining substantially pure superoxides from commercially available materials. While the invention as described has particular reference to $KO_2$ and $NaO_2$, other metal superoxides should be producible by the same or substantially the same process. Variations in the materials, quantities of the same, concentrations, temperatures and times involved in practicing the invention are considered to be within the scope of one skilled in the art and within the purview of the appended claims.

What is claimed is:
1. The process for producing potassium superoxide which comprises mixing the solid potassium hydroxide with hydrogen peroxide having a concentration greater than forty percent, stirring the resulting reaction mixture until the evolution of oxygen and water vapor ceases, and subjecting the resulting reaction mixture to desiccation to isolate the potassium superoxide.
2. The invention according to claim 1 wherein the desiccation comprises subjecting the mixture to a vacuum over concentrated sulfuric acid.
3. The invention according to claim 1 wherein the desiccating step is taken within approximately one minute following the cessation of evolution of water vapor and oxygen from the reaction mixture.
4. The invention according to claim 1 wherein the mixing of the hydrogen peroxide with the potassium hydroxide is carried out at a temperature reduced below normal room temperature.
5. The process for producing potassium superoxide which comprises slowly adding hydrogen peroxide having a concentration greater than forty percent to solid potassium hydroxide in a molar ratio of approximately 2:1, stirring the resulting reaction mixture until the evolution of oxygen and water vapor ceases, and subjecting the mixture to vacuum desiccation over a suitable desiccant to isolate the resulting potassium superoxide.

References Cited in the file of this patent
UNITED STATES PATENTS
2,648,596    Schechter _____ Aug. 11, 1953
OTHER REFERENCES Journal Chem. Education, vol. 24, June 1947, pages 302–303. (Copy in U.S. Patent Office Scientific Lib. or 23–184 Lit.)